US006242068B1

(12) United States Patent
Preuss

(10) Patent No.: US 6,242,068 B1
(45) Date of Patent: Jun. 5, 2001

(54) RECORDABLE OPTICAL MEDIA WITH A SILVER-PALLADIUM REFLECTIVE LAYER

(75) Inventor: Donald R. Preuss, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/473,631

(22) Filed: Dec. 28, 1999

(51) Int. Cl.[7] .......... B32B 3/02

(52) U.S. Cl. .......... 428/64.4; 428/64.4; 428/64.8; 428/457; 428/913; 430/270.16; 430/495.1; 430/945; 369/283; 369/288

(58) Field of Search .......... 428/64.1, 64.2, 428/64.4, 64.8, 457, 913; 430/270.14, 270.16, 495.1, 945; 369/283, 288

(56) References Cited

U.S. PATENT DOCUMENTS

| | | |
|---|---|---|
| 4,577,291 | 3/1986 | Cornet . |
| 4,940,618 | 7/1990 | Hamada et al. . |
| 4,990,388 | 2/1991 | Hamada et al. . |
| 5,009,818 | 4/1991 | Arai et al. . |
| 5,075,147 | 12/1991 | Usami et al. . |
| 5,080,946 | 1/1992 | Takagisi et al. . |
| 5,090,009 | 2/1992 | Hamada et al. . |
| 5,312,663 | 5/1994 | Kosinski et al. . |
| 5,492,744 | 2/1996 | Koike et al. . |
| 5,646,273 | 7/1997 | Oguchi et al. . |
| 5,922,504 | 7/1999 | Chapman et al. . |
| 5,948,497 | 9/1999 | Hatwar et al. . |

FOREIGN PATENT DOCUMENTS

| | | |
|---|---|---|
| 594516 | 5/1998 | (EP) . |

OTHER PUBLICATIONS

John L. Vossen et al., Thin Film Process, Academic Press Inc. p. 514, 1978.

*Primary Examiner*—Elizabeth Evans
(74) *Attorney, Agent, or Firm*—Raymond L. Owens

(57) ABSTRACT

A recordable optical medium includes a transparent substrate, a dye recording layer on the transparent substrate, a reflective layer provided on the dye layer wherein the reflective layer comprises a mixture of silver and palladium in such proportions that the palladium comprises between 0.25 and 2.5 atomic percent of the mixture, and a protective layer formed over the reflective layer.

7 Claims, 2 Drawing Sheets

RECORDABLE OPTICAL MEDIA WITH A SILVER-PALLADIUM REFLECTIVE LAYER

FIELD OF THE INVENTION

This invention relates generally to optical media and, more particularly, to the reflecting layer typically found on recordable optical media.

BACKGROUND OF THE INVENTION

Recordable optical media such as recordable compact discs (CD-R) and recordable digital versatile disks (DVD-R), that is data disks upon which information can be written after the manufacture thereof, are known. The media is usually in the form of disks but can be in other forms such as optical tape or optical data cards. Recordable optical media typically has a transparent substrate, a dye containing recording layer is disposed on top of the substrate, a reflective layer is formed on top of the dye layer, and a protective layer is formed on top of the reflective layer. The transparent substrate typically has a groove on its surface. Embossing or injection molding can form the groove.

Typical dye layers are described in commonly-assigned U.S. Pat. No. 5,922,504 which describes the use of cyanine and formazan dye mixtures in CD-R media, U.S. Pat. No. 5,646,273 which describes the use of pthalocyanene dye in CD-R media, and U.S. Pat. No. 5,492,744 describes the use of benzoylferrocene as a beneficial additive to pthalocyanene dye in CD-R media.

Typical recordable optical media use a thin layer of gold as the reflective layer. (CD-ROM or "stamped" CDs often have an aluminum reflective layer. However, since a recordable CD requires that the light pass through the dye containing recording layer during writing and reading, a higher reflective material, such as gold, is needed for a recordable CD.) The gold reflective layer exhibits both high stability and high reflectivity. However, gold is expensive and has recently been replaced by silver by a number of CD-R manufacturers. Silver, in addition to being much less expensive, also has a slightly higher reflectivity at the wavelength of light used by CD readers and writers. However, silver is also known to be more reactive than gold. We have found that in accelerated keeping tests, recordable CDs with silver reflective layers often display less than desired stability. Trade journals have indicated that many customers have concerns over the expected lifetime of recordable optical disks with silver reflective layers. A benchmark test of the stability of optical media is the length of time which media with data recorded on them can survive in a high temperature and humidity environment. A condition frequently selected by testers is 80° C. and 85% relative humidity (RH). Typically, media fabricated with 100% silver as the reflective layer will work well initially but will fail this incubation condition in a time much less than media with a gold reflective layer.

Commonly assigned U.S. Pat. No. 5,948,849 and commonly-assigned European Patent 0594516 discuss the use of silver-palladium, and silver-palladium-copper reflective layers in recordable compact disc media.

SUMMARY OF THE INVENTION

It is an object of the present invention to provide an optical medium such as CD-R or DVD-R, with a reflective layer that would have the reduced price of silver, the high reflectivity of both silver and gold, and a stability much greater than is provided by a pure silver reflective layer.

The present invention provides a dye based recordable optical medium such as CD-R or DVD-R with an improved reflective layer which has a reflectivity comparable to gold or silver, a cost substantially less than gold, and a stability substantially greater than pure silver.

This object is achieved by a recordable optical medium comprising:

(a) a transparent substrate;

(b) a dye recording layer on the transparent substrate;

(c) a reflective layer provided on the dye layer wherein the reflective layer comprises a mixture of silver and palladium in such proportions that the palladium comprises between 0.25 and 2.5 atomic percent of the mixture; and (d) a protective layer formed over the reflective layer.

The combination of certain dye recording layers with particular reflective layers provide the desired cost savings and stability. It was found, quite unexpectedly, that the preferred range of Pd in Ag is limited to a narrow region of 0.25% to 2.5%. This has been discovered when considering the incubational stability of the metric of block error rate in the read back of compact disc data, rather than just the incubational stability of the reflectivity of the media.

DETAILED DESCRIPTION OF THE INVENTION

The invention will be described in particular reference to recordable compact discs (CD-R) but it will be understood that the invention is equally applicable to digital versatile disks (DVD-R) and other recordable optical media as well.

Figure 1:
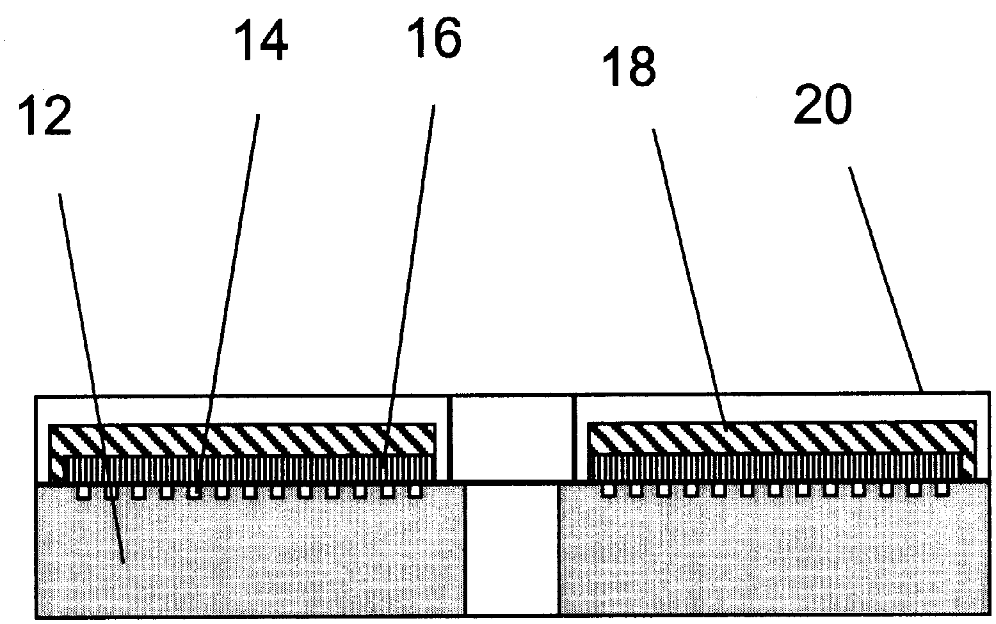
FIG. 1 is a cross sectional view of the recordable optical medium such as a recordable compact disc.

As depicted in FIG. 1, recordable optical medium 10 includes a transparent substrate 12 which may have an embossed groove 14 with a dye containing recording layer 16 (frequently referred to as simply a dye recording layer), a reflective layer 18, and a protective layer 20 (or layers). Fabrication of the recordable media begins with the transparent substrate 12 which is typically polycarbonate, formed by injection molding most often with a spiral groove embossed in one surface in the manner of commercially available CD-Rs.

The transparent substrate 12 may be any transparent material that satisfies the mechanical and optical requirements. The transparent substrate 12 is generally pregrooved with groove depths from 20 nm to 250 nm, groove widths 0.2 to 1 μm and a pitch 0.5 to 2 μm. As noted, the preferred material is polycarbonate. Other useful materials include glass, polymethylmethacrylate and other suitable polymeric materials.

In accordance with the present invention, the dye recording layer 16 may contain an organic dye, or a metal complex of an organic dye such as a porphryin or phthalocyanine dye. Other classes of materials which may serve as the recording layer include but are not limited to formazans and cyanines.

The dye recording layer 16 is typically formed by dissolving the dye or dye mixture (and addenda where applicable), in an organic solvent and then spin coating the solution onto the transparent substrate 12. For coating, the dye mixture, with or without addenda, is preferably dissolved in a suitable solvent such that the dye is 20 or less parts by weight to 100 parts of solvent by volume.

Coating solvents for the dye recording layer 16 are selected to minimize their effect on the substrate. Useful solvents include hydrocarbons, substituted cycloalkanes, alcohols, ethers, hydrocarbon halides, cellosolves, and ketones. Examples of solvents are ethylcyclohexane, 2,2,3,3-tetrafluoropropanol, tetrachloroethane, dichloromethane, dioxane, methyl cellosolve, ethyl cellosolve, 1-methoxy-2-propanol, 4-hydroxy-4-methyl-2-pentanone. Preferred solvents are alcohols since they have the least effect on the preferred polycarbonate substrates. Mixtures containing these solvents can also be used. A particularly useful solvent mixture is ethylcyclohexane and dioxane at a ratio by weight of 9:1.

Useful addenda for the dye recording layer 16 include stabilizers, surfactants, binders and diluents. Preferred addenda for the metalized phthalocyanine dye-recording layer are described in U.S. Pat. No. 5,492,744 mentioned above. The currently preferred addendum is benzoylferrocene in an amount between 2% and 12% by weight of the dye recording layer 16.

In accordance with the present invention, the reflective layer 18 includes a mixture of silver and palladium, which is applied by vacuum deposition, preferably dc magnetron sputtering. The reflective layer 18 can include two or more lamina so long as the lamina or layer in contact with the dye containing recording layer has the composition of silver and palladium as described.

Application of the reflective layer 18 of the invention may be achieved by co-depositing silver and palladium simultaneously from two independently controlled sources each containing one of the pure metals or it may be achieved by depositing from a single source containing a mixture of the two metals. In the case of dual sources, it is desirable to rotate the dye-coated substrate (for example at 300 rpm) in order to insure a uniform mixture of the two metals in the reflective layer. In addition to dc magnetron sputtering, the reflective layer 18 of the invention can be applied by any method of vacuum deposition.

It has been discovered that optical media is most stable when the silver-palladium mixture contains palladium in the range of 0.25 to 2.5 atomic percent. Mixtures over a significantly larger composition range (0 to 15 atomic percent of palladium were tested) can provide reflective layers 18 with superior stability than pure silver, however, at greater than 15 atomic percent palladium the material cost is undesirable, at greater than 2.5 atomic percent palladium, the reflectivity of the freshly coated reflective layer 18 drops to an undesirable level for most CD-R applications (see FIG. 2) and below 0.25 atomic percent palladium, the long term stability of media (with regard to corrosion and loss of reflectivity during accelerated aging tests) is less than desired for use with some dye recording layers. Finally, it was found that above 2.5 atomic percent palladium in the reflective layer 18 mixture, undesirable features (referred to here as "dark marks") can occur in incubated recording media, in which, a small but significant percentage of the data marks lose contrast due to an unknown mechanism. This causes the rate of errors during the read back to increase beyond that of even a pure silver reflector. Consequently, although higher percentages of palladium in the reflector alloy may prevent corrosion or reflectivity loss, it creates a medium which is less capable of retaining data integrity during accelerated aging tests. These effects limit the most useful range of reflective layer compositions is 0.25 to 2.5 atomic percent of palladium in silver, and preferably, 0.5 to 2.0 atomic percent of palladium in silver.

The reflective layer 18 is coated to a thickness such that the effectivity of the reflective layer at the read wavelength (780 nm for CD-R, 630–650 nm for DVD-R) is at least 95% of the reflectivity for an optically opaque film (substantially no light transmission). It is preferred that the reflective layer 18 be coated to a thickness of at least 500 angstroms.

Over the reflective layer 18 is a protective layer 20. The protective layer 20 can include a number of lamina or layers. The protective layer 20 can include what is generally referred to in this art as a lacquer. The lacquer for the protective layer 20 may be one of many UV curable materials also used in the manufacture of audio CDs as well as CD-Rs, and is applied by spin coating, followed by a brief exposure to intense UV light to effect curing of the material.

One preferred protective layer is disclosed in commonly assigned U.S. Pat. No. 5,312,663. This patent discloses a two-layer structure in which the layer adjacent to the reflective layer is spin coated and the second layer is screen-printed.

The media of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

Analytical Methodology for Determining Stability

There are four methods for analyzing media before and after incubation. The first method is by microscopy. The samples are viewed through the substrate using infrared light. (In a CD reader, the disk is read through the substrate using infrared light.) Under high magnification, incubated media show small dark features typically 1 micron or less in size. These features are suspected to be corrosion, and are referred to as such, although there is no evidence that a corrosion process forms them. The exact mechanism is not relevant. What is clear is that these small dark features are unwanted and affect the performance of the media.

The second analytical method involves writing on media with a CD writer, and then reading the information back in a CD reader. Every second, the number of data blocks, which are in error, is logged. This is called the block error rate (BLER). The average value of BLER for a partially or fully written disk is called BLERavg. The CD-R specification requires that BLER never exceed 220. Commercially available disks typically have BLERavg values in the range of 0 to 10.

The third analytical method requires that unwritten media be placed in a modified disk reader. The data signal for an unwritten disk should be a constant signal. Due to small defects (such as the small dark features mentioned above) the actual data signal contains "drop outs", where the signal falls below a threshold relative to the average signal. The threshold designating a "drop out" is set to a value such that the frame defect rate (FDR) is comparable to the block error rate (BLER) which would be measured on the same piece of medium after it has been written with data. "Corrosion" type defects can cause an increase in FDR and FDRavg.

The fourth analytical method is very similar to FDR. Frequently, very small defects can be observed in microscopy, but are to small to cause an increase in BLER or FDR. It is useful to know about these very small defects, since they frequently predict the ultimate failure of media after additional incubation. Small defects can be detected by reducing the threshold used in detecting FDR to make the system more sensitive. This detection method is called sub micron micro-contamination (SMMS). An elevated SMMS value does not necessarily equate to failure of media, but does indicate that deterioration of media has taken place.

The following examples are presented for an understanding of preparing CD-R's with reflective layers comprised of silver and palladium mixtures, and the subsequent performance of such disks.

EXAMPLES 1–6

Six different silver-palladium reflective layers were prepared for evaluation of reflectivity only. Six featureless polycarbonate substrates (which lacked the embossed groove typical of CD-R media) were sequentially installed in a vacuum chamber in which a small dc magnetron sputter gun equipped with a 2 inch palladium target, and one equipped with a 2 inch silver target were present. The disks were located approximately 2 inches in front of the guns, such that the guns were directed midway between the center of the disk, and the outer edge of the disk. The disk was then rotated at 300 rpm so that the materials deposited from each gun were well mixed in the resulting film. The chamber was fed with argon gas at a rate of 20 standard cubic centimeters per minute (sccm), resulting in a pressure of approximately 10 mTorr. Specific alloy compositions were prepared by controlling the sputter power to the individual guns. Sufficient reflective material was coated to insure that the coated substrates had an optical density of approximately 2.0 when measured at a wavelength of 633 nm. The deposition of the reflective layer required 15 seconds, and the total power to the two guns was 350 Watts. The power to the palladium gun was set to 6 different levels, giving 6 different compositions for the reflective layer. The 6 metalized disks were then coated with a protective lacquer, and UV cured. Table 1 summarizes the disks that were fabricated in the above manner. The atom percent compositions were obtained by assuming that the sputter yields of palladium and silver are 1.7 and 2.7 respectively. (John L Vossen et al, *Thin Film Process,* Acedemic Press Inc., p. 514, (1978).

TABLE 1

| Example | Ag power requested | Pd power requested | Pd power delivered | Power % Pd | Atom % Pd |
|---|---|---|---|---|---|
| 1 | 350.0 W | 0.0 W | 0.0 W | 0% | 0.0% |
| 2 | 346.5 W | 3.5 W | 2.5 W | 0.7% | 0.5% |
| 3 | 343.0 W | 7.0 W | 6.0 W | 1.7% | 1.2% |
| 4 | 339.5 W | 10.5 W | 9.5 W | 2.7% | 1.9% |
| 5 | 336.0 W | 14.0 W | 13.0 W | 3.7% | 2.6% |
| 6 | 232.5 W | 17.5 W | 16.5 W | 4.7% | 3.2% |

Figure 2:
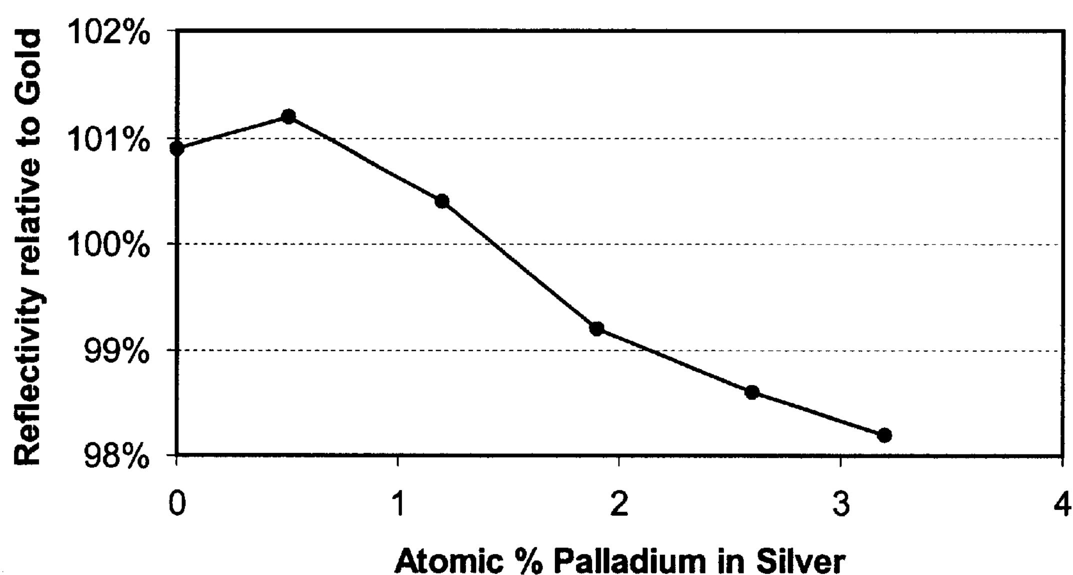
FIG. 2 is a plot of the reflectivity of silver palladium alloys relative to pure gold, as a function of palladium content.

The reflectivities of the discs were measured at the CD-R operating wavelength of 780 nm. Each film was measured with the light incident on the uncoated side of the polycarbonate disc. The reflected light was collected with an integrating sphere. The instrument was calibrated such an optically thick gold reflector measured in the same manner would register as 100% reflectivity. The results of these measurements are shown in FIG. 2.

The pure silver film shows a reflectivity greater than 100%. This only implies that silver is a better reflector than pure gold. As the palladium fraction is increased to 3%, the reflectivity drops to about 98%. It is not desirable to work with reflective layers with significantly reduced reflectivity (relative to gold) since it becomes increasingly difficult to meet the industry specifications of CD-R media. This may not apply to other formats of recordable media. We do not believe that there is any significance to the slightly higher reflectivity of the 0.6% palladium disc compared to the 100% silver disc.

EXAMPLES 7–12

A set of six CD-R substrates (with an appropriate groove necessary for a recordable CD) were coated with a standard dye recording layer including a pthalocyanine dye containing 8.65% benzoylferrocene which if coated with a gold reflector and protective lacquer, would constitute a typical CD-R available commerically. Reflective layers and protective lacquer layers were applied to the discs with dye recording layers in the manner described above for Examples 1–6, and summarized in Table 1.

Examples 7–12 were measured for SMMSavg and FDRavg in the manner described under Analytical Methods above. Recall that this method detects defects on unrecorded media which might result in readback errors if the disk were written and subsequently read. This process was repeated after 1 week, 3 weeks and 6 weeks incubation at 80° C. and 85% relative humidity. Optical microscopy was also performed after 1 week and 6 weeks of incubation. Table 2, Table 3 and Table 4 summarize the microscopic analyses, the SMMS measurements, and the FDR measurements respectively.

TABLE 2

| | Atom % | Microscopy | | |
|---|---|---|---|---|
| Example | Palladium | 0 weeks | 1 week | 6 weeks |
| 7 | 0.0% | ok | ok | light corrosion |
| 8 | 0.5% | ok | ok | light corrosion |
| 9 | 1.2% | ok | ok | light corrosion |
| 10 | 1.9% | ok | ok | light corrosion |
| 11 | 2.6% | ok | ok | ok |
| 12 | 3.2% | ok | ok | ok |

TABLE 3

| | Atom % | SMMSavg | | | |
|---|---|---|---|---|---|
| Example | Palladium | 0 weeks | 1 week | 3 weeks | 6 weeks |
| 7 | 0.0% | 13 | 151 | 999 | 999 |
| 8 | 0.5% | 11 | 11 | 369 | 999 |
| 9 | 1.2% | 11 | 10 | 26 | 999 |
| 10 | 1.9% | 10 | 10 | 12 | 90 |
| 11 | 2.6% | 10 | 10 | 12 | 18 |
| 12 | 3.2% | 13 | 11 | 13 | 15 |

TABLE 4

| | Atom % | FDRavg | | | |
|---|---|---|---|---|---|
| Example | Palladium | 0 weeks | 1 week | 3 weeks | 6 weeks |
| 7 | 0.0% | 5 | 6 | 10 | 34 |
| 8 | 0.5% | 4 | 5 | 4 | 7 |
| 9 | 1.2% | 4 | 4 | 4 | 4 |
| 10 | 1.9% | 4 | 4 | 4 | 4 |
| 11 | 2.6% | 4 | 4 | 4 | 4 |
| 12 | 3.2% | 4 | 4 | 4 | 4 |

It is clear from the data in the tables that media with pure silver reflective layer degrade as a result of incubation, and that the addition of palladium retards the rate of degradation. Even 0.5 atom percent of palladium has a substantial effect on extending the life of the unwritten media.

EXAMPLES 13–18

A set of six CD-R substrates (with an appropriate groove necessary for a recorable CD) were coated with a standard dye recording layer including a mixture of two cyanine dyes and a formazan dye which if coated with a gold reflector and protective lacquer, would constitute a typical CD-R available commercially. Reflective layers and protective lacquer layers were applied to the discs with dye recording layers in the manner described above for Examples 1–6, and summarized in Table 1.

Examples 13–18 were measured for SMMSavg and FDRavg in the manner described under Analytical Methods above. This process was repeated after 1 week, 3 weeks and 6 weeks incubation at 80° C. and 85% relative humidity. Optical microscopy was also performed after 1 week of incubation. Table 5, Table 6 and Table 7 summarize the microscopic analyses, the SMMS measurements, and the FDR measurements respectively.

TABLE 5

| | Atom % | Microscopy | |
|---|---|---|---|
| Example | Palladium | 0 weeks | 1 week |
| 13 | 0.0% | ok | corrosion |
| 14 | 0.5% | ok | corrosion |
| 15 | 1.2% | ok | corrosion |
| 16 | 1.9% | ok | light corrosion |
| 17 | 2.6% | ok | ok |
| 18 | 3.2% | ok | ok |

TABLE 6

| | Atom % | SMMSavg | | | |
|---|---|---|---|---|---|
| Example | Palladium | 0 weeks | 1 week | 3 weeks | 6 weeks |
| 13 | 0.0% | 28 | 999 | 999 | na[1] |
| 14 | 0.5% | 34 | 999 | 999 | na[1] |
| 15 | 1.2% | 29 | 550 | 999 | na[1] |
| 16 | 1.9% | 35 | 31 | 950 | na[1] |
| 17 | 2.6% | 28 | 22 | 28 | na[1] |
| 18 | 3.2% | 36 | 30 | 32 | na[1] |

[1]discs were not testable due to package delamination

TABLE 7

| | Atom % | FDRavg | | | |
|---|---|---|---|---|---|
| Example | Palladium | 0 weeks | 1 week | 3 weeks | 6 weeks |
| 13 | 0.0% | 2 | 999 | 999 | na[1] |
| 14 | 0.5% | 5 | 999 | 999 | na[1] |
| 15 | 1.2% | 2 | 2 | 4 | na[1] |
| 16 | 1.9% | 5 | 4 | 5 | na[1] |
| 17 | 2.6% | 2 | 2 | 3 | na[1] |
| 18 | 3.2% | 5 | 4 | 5 | na[1] |

[1]discs were not testable due to package delamination

It is clear from the data in the tables that the pure silver media degrades as a result of incubation, and that the addition of palladium retards the rate of degradation. The dye mixture in examples 13–18 degrades faster than the pthalocyanine mixture in Examples 7–12, but even so, only 1.2% of palladium was sufficient to extend the life of unwritten media beyond 3 weeks at 80° C. and 85%RH. Recall that although SMMS and microscopy can see early degradation, only elevated FDR values indicate reduced performance of media in a disc reader.

EXAMPLES 19–24

A set of six CD-R substrates (with an appropriate groove necessary for a recordable CD) were coated with a standard dye recording layer including a pthalocyanine dye containing 8.65% benzoylferrocene which if coated with a gold reflector and protective lacquer, would constitute a typical CD-R available commercially. Reflective layers and protective lacquer layers were applied to the discs with dye recording layers in the manner described above for Examples 1–6, and summarized in Table 1. At this point, examples 19–24 are identical to examples 7–12. The present discs were then placed in a Kodak PCD-200 CD writer, and written at twice normal (2×) CD speed until the data area was fully written (called a full surface write). These discs behaved as normal CD-R media. They were then placed in a CD reader/tester, in order to measure block error rate over the entire recording surface of the disc, and to report the average block error rate (BLERavg) in the manner described under Analytical Methods above. This process was repeated after 1 week, 3 weeks and 6 weeks incubation at 80° C. and 85% relative humidity. Optical microscopy was also performed after 1 week of incubation. Table 8 and Table 9 summarize the microscopic analyses, and the BLERavg measurements respectively.

TABLE 8

| | Atom % | Microscopy | | |
|---|---|---|---|---|
| Example | Palladium | 0 weeks | 1 week | 6 weeks |
| 19 | 0.0% | ok | ok | light corrosion |
| 20 | 0.5% | ok | ok | ok |
| 21 | 1.2% | ok | ok | ok |
| 22 | 1.9% | ok | ok | ok |
| 23 | 2.6% | ok | Dark marks[1] | na[2] |
| 24 | 3.2% | ok | Dark marks[1] | na[2] |

[1]dark marks are data marks which have lost contrast due to an unknown mechanism. They usually cause readback errors, resulting in elevated BLER.
[2]discs were not tested due to package delamination

TABLE 9

| | Atom % | BLERavg | | | |
|---|---|---|---|---|---|
| Example | Palladium | 0 weeks | 1 week | 3 weeks | 6 weeks |
| 19 | 0.0% | 4 | 4 | 13 | 47 |
| 20 | 0.5% | 2 | 2 | 2 | 3 |
| 21 | 1.2% | 3 | 2 | 3 | 4 |
| 22 | 1.9% | 4 | 4 | 4[1] | 3 |
| 23 | 2.6% | 3 | 13 | 20 | na[2] |
| 24 | 3.2% | 2 | 152 | 205 | na[2] |

[1]value had to be estimated from graph due to computer data corruption
[2]discs were not testable due to package delamination Here it is clear that pure silver written disc has suffered a significant increase in the block error rate after 3 weeks, and continued degradation after 6 weeks of incubation. Only 0.5% of palladium prevented this degradation. This is in line with the FDR results of samples 7 through 12 which suffered similar degradation on unwritten discs. Regarding the microscopy results in Table 2 for unwritten pthalocyanine media, and Table 8 for written pthalocyanine media, the light corrosion visible in discs with less than 2% palladium observed in unwritten media was only observed in the palladium free disc when written. This is due to the fact that written data makes it more difficult for the microscopist to discern the small dark features which we have referred to as corrosion.

A second aspect of note is that samples 23 and 24 have increased BLER values after incubation. Microscopic examination revealed the presence of "dark marks". This term refers to data marks which normally appear as less reflective than the unwritten background, but which have lost their contrast such that they are now indistinguishable from the background. The reader is unable to detect the presence of the previously written mark, and results in a read back error. Only a small fraction of the marks become "dark", leaving most of the data in tact. However this small fraction of marks is sufficient to cause large numbers of read errors resulting in high BLER, and subsequent loss of data. For this reason, palladium levels above 2.5% have a reduced resistance to incubation at 80° C. and 85%RH.

A preferred embodiment of the silver-palladium reflective layer would be 0.5 atomic percent to 2.0 atomic percent of palladium in silver. This is expected to vary somewhat as the composition of the dye recording layer is altered. This range is suitable to extend the lifetime by retarding corrosion, while maintaining high reflectivity necessary for the CD-R standards, and avoiding the formation of detrimental dark marks which can occur at higher levels of palladium.

The invention has been described in detail with particular reference to certain preferred embodiments thereof, but it will be understood that variations and modifications can be effected within the spirit and scope of the invention.

PARTS LIST

10 recordable optical medium
12 transparent substrate
14 groove
16 dye recording layer
18 reflective layer
20 protective layer

What is claimed is:

1. A recordable optical medium comprising:

(a) a transparent substrate;

(b) a dye recording layer on the transparent substrate;

(c) a reflective layer provided on the dye layer wherein the reflective layer comprises a mixture of silver and palladium in such proportions that the palladium comprises between 0.25 and 2.5 atomic percent of the mixture; and (d) a protective layer formed over the reflective layer.

2. The recordable optical medium according to claim 1 wherein the reflective layer comprises a mixture of silver and palladium in such proportions that the palladium is in a range between 0.5 and 2.0 atomic percent of the mixture.

3. The recordable optical medium according to claim 2 wherein the dye recording layer includes a pthalocyanine dye.

4. The recordable optical medium according to claim 2 wherein the dye recording layer includes a pthalocyanine dye further includes the additive benzoylferrocene in an amount between 2% and 12% by weight of the recording layer.

5. The recordable optical medium according to claim 1 wherein the disk is a recordable compact disc.

6. The recordable optical medium according to claim 4 wherein the medium is a recordable compact disc.

7. The recordable optical disk according to claim 6 wherein the reflective layer is at least 500 angstroms thick.

* * * * *